US006534570B2

(12) United States Patent
Farrow et al.

(10) Patent No.: US 6,534,570 B2
(45) Date of Patent: Mar. 18, 2003

(54) ORGANOCLAY COMPOSITIONS FOR GELLING UNSATURATED POLYESTER RESIN SYSTEMS

(75) Inventors: Thomas C. Farrow, Gonzales, TX (US); Chris A. Rasmussen, Gonzales, TX (US); William R. Menking, Gonzales, TX (US); David Hugh Durham, Gonzales, TX (US)

(73) Assignee: Southern Clay Products, Inc., Gonzales, TX (US)

( * ) Notice: Subject to any disclaimer, the term of this patent is extended or adjusted under 35 U.S.C. 154(b) by 0 days.

(21) Appl. No.: 09/922,404

(22) Filed: Aug. 3, 2001

(65) Prior Publication Data

US 2002/0002230 A1 Jan. 3, 2002

Related U.S. Application Data

(62) Division of application No. 09/068,277, filed on Oct. 29, 1998.
(60) Provisional application No. 60/006,310, filed on Nov. 7, 1995.

(51) Int. Cl.⁷ .......................... C08K 3/34; C08L 67/06; C04B 14/04
(52) U.S. Cl. ................... 523/513; 523/521; 106/487; 252/378 R; 524/445; 524/492
(58) Field of Search ................ 523/513, 521; 106/487; 252/378 R; 524/445, 492

(56) References Cited

U.S. PATENT DOCUMENTS

| | | |
|---|---|---|
| 2,289,032 A | 7/1942 | Moffitt |
| 2,531,396 A | 11/1950 | Carter et al. |
| 2,531,427 A | 11/1950 | Hauser |
| 2,531,812 A | 11/1950 | Hauser |
| 2,552,775 A | 5/1951 | Fischer et al. |
| 2,966,506 A | 12/1960 | Jordan |
| 3,027,322 A | 3/1962 | Stuchell et al. |
| 3,227,675 A | 1/1966 | Papalos |
| 3,252,757 A | 5/1966 | Granquist |
| 3,290,165 A | 12/1966 | Iannicelli |
| 3,509,066 A | 4/1970 | Jacobs et al. |
| 3,537,994 A | 11/1970 | House |
| 3,567,680 A | 3/1971 | Iannicelli |
| 3,586,468 A | 6/1971 | Sims et al. |
| 3,671,190 A | 6/1972 | Neumann |
| 3,687,846 A | 8/1972 | Lang |
| 3,691,070 A | 9/1972 | Pippen |
| 3,764,456 A | 10/1973 | Woodhams |
| 3,804,656 A | 4/1974 | Kaliski et al. |
| 3,844,978 A | 10/1974 | Hickson |
| 3,844,979 A | 10/1974 | Hickson |
| 3,852,405 A | 12/1974 | Granquist |
| 3,855,147 A | 12/1974 | Granquist |
| 3,915,867 A | 10/1975 | Kang et al. |
| 3,974,125 A | 8/1976 | Oswald et al. |
| 4,033,893 A | 7/1977 | Mondshine |
| 4,081,496 A | 3/1978 | Finlayson |
| 4,087,365 A | 5/1978 | Clem |
| 4,105,578 A | 8/1978 | Finlayson et al. |
| 4,190,686 A | 2/1980 | Muis |
| 4,216,135 A | 8/1980 | Finlayson |
| 4,216,188 A | 8/1980 | Shabrai et al. |
| 4,240,951 A | 12/1980 | Moll, Jr. et al. |

(List continued on next page.)

FOREIGN PATENT DOCUMENTS

| | | |
|---|---|---|
| DE | 3 434 983 A | 4/1986 |
| EP | 0 204 240 | 5/1986 |
| EP | 0 221 225 | 5/1987 |
| EP | 0 315 987 | 5/1989 |
| EP | 0 798 267 A1 | 10/1997 |
| EP | 0 952 187 | 10/1999 |
| WO | 92/19693 | 11/1992 |
| WO | 93/04117 | 3/1993 |
| WO | 97/00910 | 1/1997 |
| WO | 97/17398 | 5/1997 |
| WO | 97/30950 | 8/1997 |
| WO | 97/42279 | 11/1997 |

OTHER PUBLICATIONS

Plueddemann et al., "Surface Treatments of Industrial Minerals for Polymer Composites," 1989, pp. 1–19.
"Silane Chemistry Primer," ©1995 Dow Corning Corporation, 4 pgs.
Okikata et al., "Rheological Properties of the Partially Hydrophobic Montmorillonite Treated with Alkyltrialkoxysilane," 1995, pp. 299–310.
Wanner et al., "The Acid/Base Chemistry of Montomorillonite," 1994, pp. 733–738.
Murphy, "Reinforced and Filled Thermoplastics," 1966, pp. 41–49.
Zisman, "Improving the Performance of Reinforced Plastics," 1965, pp. 26–34.
Dannenberg, "The Effects of Surface Chemical Interactions on the Properties of Filler–Reinforced Rubbers," pp. 410–444.
Jones et al., "Sepiolite and Palygorskite," pp. 631–674.
Darley et al. "Compositions and Properties of Drilling and Completion Fluids," 1988, pp. 463–464, 559–562.
Hongbai Lao et al "Molecular Recognition in Microporous Organo–Minerals, Shape Specific Intoractions of Carbon Dioxide in Functionalized Organo–Montmorillonite Microcavities," Chemistry of Materials, vol. 3.(5) pp. 1009–1011.

*Primary Examiner*—Tae H. Yoon
(74) *Attorney, Agent, or Firm*—Meyertons, Hood, Kivlin, Kowert & Goetzel, P.C.; Eric B. Meyertons

(57) ABSTRACT

An organoclay composition for gelling unsaturated polyester resin/monomer systems comprising a mineral clay mixture which has been treated with an alkyl quaternary ammonium compound. The mineral clay mixture comprises two components; mineral clay (a) comprising greater than 50 wt. %, based on the weight of the mineral clay mixture, of a mineral clay selected from the group consisting of sepiolite, palygorskite and mixtures of sepiolite and palygorskite; and mineral clay (b) comprising less than 50 wt. %, based on the weight of the mineral clay mixture, of a smectite.

33 Claims, No Drawings

U.S. PATENT DOCUMENTS

| | | |
|---|---|---|
| 4,314,919 A | 2/1982 | Washabaugh et al. |
| 4,382,868 A | 5/1983 | House |
| 4,386,010 A | 5/1983 | Hildebrandt |
| 4,412,018 A | 10/1983 | Finlayson et al. |
| 4,454,237 A | 6/1984 | Hoda et al. |
| 4,455,382 A | 6/1984 | Wu |
| 4,462,470 A | 7/1984 | Alexander et al. |
| 4,464,274 A | 8/1984 | House |
| 4,465,542 A | 8/1984 | Furihata |
| 4,473,675 A | 9/1984 | Knudson, Jr. et al. |
| 4,480,060 A | 10/1984 | Hoda et al. |
| 4,508,628 A | 4/1985 | Walker et al. |
| 4,568,923 A | 2/1986 | Knudson, Jr. et al. |
| 4,569,923 A | 2/1986 | Knudson, Jr. et al. |
| 4,600,515 A | 7/1986 | Gleason et al. |
| 4,664,842 A | 5/1987 | Knudson, Jr. et al. |
| 4,667,158 A | 5/1987 | Redlich |
| 4,690,868 A | 9/1987 | Rice |
| 4,695,402 A | 9/1987 | Finlayson et al. |
| 4,724,098 A | 2/1988 | Kalz et al. |
| 4,739,007 A | 4/1988 | Okada et al. |
| 4,743,305 A | 5/1988 | Doidge et al. |
| 4,753,974 A | 6/1988 | Goodman et al. |
| 4,789,403 A | 12/1988 | Rice |
| 4,810,734 A | 3/1989 | Kawasumi et al. |
| 4,876,030 A | 10/1989 | Dixon et al. |
| 4,889,885 A | 12/1989 | Usuki et al. |
| 4,990,405 A | 2/1991 | Bohrn et al. |
| 5,061,744 A | 10/1991 | Ogitani et al. |
| 5,110,501 A | 5/1992 | Knudson, Jr. et al. |
| 5,114,895 A | 5/1992 | Holmgren et al. |
| 5,151,155 A | 9/1992 | Cody et al. |
| 5,160,454 A | 11/1992 | Knudson, Jr. et al. |
| 5,164,440 A | 11/1992 | Deguchi et al. |
| 5,188,064 A | 2/1993 | House |
| 5,334,241 A | 8/1994 | Jordan |
| 5,385,776 A | 1/1995 | Maxfield et al. |
| 5,552,469 A | 9/1996 | Beall et al. |
| 5,554,670 A | 9/1996 | Giannelis et al. |
| 5,574,179 A | 11/1996 | Wahl et al. |
| 5,576,257 A | 11/1996 | Jordan |
| 5,578,672 A | 11/1996 | Beall et al. |
| 5,616,286 A | 4/1997 | Jordan |
| 5,718,841 A | 2/1998 | Mardis et al. |
| 5,728,764 A | 3/1998 | Bauer et al. |
| 5,735,943 A | 4/1998 | Cody et al. |
| 5,739,087 A | 4/1998 | Dennis |
| 5,786,417 A | 7/1998 | Ogawa et al. |
| 5,837,654 A | 11/1998 | Carroll et al. |
| 5,916,863 A | 6/1999 | Iacobucci et al. |
| 6,036,765 A | 3/2000 | Farrow et al. |
| 6,037,315 A | 3/2000 | Franklin et al. |
| 6,187,719 B1 | 2/2001 | Dino et al. |

ORGANOCLAY COMPOSITIONS FOR GELLING UNSATURATED POLYESTER RESIN SYSTEMS

This is a divisional of U.S. patent application Ser. No. 09/068,277 filed on Oct. 29, 1998 entitled "Organoclay Compositions for Gelling Unsaturated Polyester Resin Systems" which claims benefit of Provisional Application No. 60/006,310 filed on Nov. 7, 1995.

FIELD OF THE INVENTION

This invention relates to organoclay compositions, which are readily dispersible in unsaturated polyester resin systems and are adapted to confer thixotropic properties to such systems.

BACKGROUND OF THE INVENTION

Fumed silica is currently used as a direct additive for rheological control of unsaturated polyester resin systems. Organoclays, typically representing the reaction product of a smectite-type clay with a quaternary ammonium compound, have also been used for these purposes, but normally require a pregel of the organoclay in styrene for proper viscosity development prior to addition to the resin system. This is discussed in numerous prior art patents, e.g. U.S. Pat. Nos. 4,473,675 and 4,240,951.

Various producers of organoclays have had limited success preparing direct add organoclays which do not require a pregel with an unsaturated polyester resin/styrene system, see for example U.S. Pat. No. 4,753,974. By and large, however, these prior efforts have not produced a product which is broadly competitive with fumed silica.

OBJECT OF THE INVENTION

Pursuant to the foregoing, it may be regarded as an object of the present invention, to provide an organoclay composition which can be stirred directly into a solution of an unsaturated polyester resin in an appropriate monomer such as styrene and which will confer thixotropic gelling properties on such system.

SUMMARY OF THE INVENTION

Now in accordance with the present invention, it has unexpectedly been discovered that combinations of certain clay minerals may be reacted with quaternary ammonium compounds to provide additives which will readily disperse and provide the required gelling properties for unsaturated polyester resin systems.

DETAILED DESCRIPTION OF THE INVENTION

The organoclay compositions of the invention which are useful for gelling unsaturated polyester resin systems comprise mineral clay mixtures which have been treated with alkyl quaternary ammonium compounds. Such mineral clay mixtures in turn comprise:

mineral clay (a) comprising greater than 50 wt. %, based on the weight of the mineral clay mixture, of a mineral clay selected from the group consisting of sepiolite, palygorskite and mixtures of sepiolite and palygorskite; and mineral clay (b) comprising less than 50 wt. %, based on the weight of the mineral clay mixture, of a smectite.

Preferably, mineral clay (a) is present in an amount of 60 to 95 wt. %, especially 70 to 90 wt. %, based on the weight of the mineral clay mixture.

Of the two mentioned phyllosilicates, sepiolite is preferred for use in the invention. Both sepiolite and palygorskite are included in the phyllosilicates because they contain a continuous two-dimensional tetrahedral sheet of composition $T_2O_5$ (T=Si, Al, Be, ...) but they differ from the other layer silicates in lacking continuous octahedral sheets. Further details of the structures of these minerals, including the structural distinctions between the two, may be found in B. F. Jones and E. Galan "Sepiolite and Palygorskite", Chapter 16 of Hydrous Phyllosilicates, *Reviews in Mineralogy*, Volume 19, (Mineralogical Society of America, Washington, D.C., 1988).

Preferably, the smectite is a natural or synthetic clay mineral selected from the group consisting of hectorite, montmorillonite, bentonite, beidelite, saponite, stevensite and mixtures thereof. A particularly preferred choice of the smectite is hectorite.

In a preferable procedure for preparing the organoclay composition, the sepiolite and/or palygorskite is crushed, ground, slurried in water and screened to remove grit and other impurities. The smectite mineral is subjected to a similar regimen. Each of the component minerals is then subjected as a dilute (1 to 6% solids) aqueous slurry to high shearing in a suitable mill. Most preferred for use in this shearing step is a homogenizing mill of the type wherein high speed fluid shear of the slurry is effected by passing the slurry at high velocities through a narrow gap, across which a high pressure differential is maintained. This type of action can e.g. be effected in the well-known Manton-Gaulin "MG") mill, which device is sometimes referred to as the "Gaulin homogenizer". Reference may be made to commonly assigned U.S. Pat. Nos. 4,664,842 and 5,110,501 for further details of such mill. The conditions for use of the MG mill may in the present instance be substantially as in the said patents; e.g. the said pressure differential across the gap is preferably in the range of from 70,300 to 562,400 $g/cm^2$ with 140,600 to 351,550 $g/cm^2$ being more typical in representative operations. Depending upon the specifics of the equipment, pressures higher than 562,400 $g/cm^2$ can readily be used. The slurry to be treated may be passed one or more times through the MG mill.

Among additional instrumentalities which can be effectively utilized in the present invention to provide high shearing of the clay components, is the rotor and stator arrangement described in commonly assigned U.S. Pat. No. 5,160,454. The use of high shear in the present invention is not only important in providing the benefits for the smectite which are discussed in the foregoing patents; but moreover in the instances of the sepiolite and/or palygorskite, such high shearing acts to "debundle" the otherwise "bundled" type of structures which exist in the latter minerals. It is this debundling action which in part is believed to be instrumental in yielding the results achieved in the present invention.

Following the high shear step, the clay components slurries may be mixed with one another. Alternatively, the two or more clay components can be intermixed in a single slurry before the latter is subjected to the high shear step. Following such step the single slurry is intermixed with the alkyl quaternary ammonium salt, after which the slurry is dewatered, and the alkyl quaternary ammonium-treated clay dried and ground to provide a dry organoclay product. Such product is found to display unexpected and highly desirable properties when used as a thixotrope in various systems. When used in the gelling of an unsaturated polyester resin, it is thus found that the composition can be stirred and dispersed directly in an unsaturated polyester resin/monomer solution, and will provide highly satisfactory gelling properties.

The alkyl quaternary ammonium salts employed for treating the mineral clay mixtures comprise alkyl quaternary ammonium salts containing the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof, preferably chloride, bromide and methylsulfate. The preferred choices of the alkyl quaternary ammonium salts are dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures of two or more of the preferred choices. The mineral clay mixture is typically treated with 25 to 80 meq., preferably 35 to 65 meq., of the alkyl quaternary ammonium salt per 100 g of the mixture. It should be understood, however, that a particular combination of mineral clay (a) and mineral clay (b) may entail an amount of alkyl quaternary ammonium salt outside the aforementioned ranges. The requisite amount of the alkyl quaternary ammonium salt will be determined by the exchange capacity of the selected mineral clay (a) and mineral clay (b).

The unsaturated polyester resin composition of the invention comprises a solution of an unsaturated polyester resin in a monomer which is capable of undergoing a crosslinking reaction with the resin and the mineral clay mixture described above. Suitable monomers for the unsaturated polyester resin are unsaturated aromatic compounds to which are bonded one or more ethylenically unsaturated radicals, such as a vinyl radical, substituted vinyl radical or an allylic radical, e.g. styrene (which is preferred), α-methylstyrene, divinyl benzene, allyl benzene and methyl methacrylate.

The unsaturated polyester resins useful for the invention may be any of those known in the prior art. Suitable examples are polyesters of dienes such as dicyclopentadiene as well as polyesters of dicarboxylic acids and diols having a major amount of olefinic unsaturation, preferably 10 to 75 olefinic groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid or anhydrides of these acids. Such polyester resins are made by conventional techniques of esterification. Generally, polyester resins having weight average molecular weights of about 400 to 10,000 and acid numbers in the range of from 35 to 45 mg KOH per gram of resin are useful for preparing the polyester compositions of the invention.

The amount of the unsaturated polyester resin in the final polyester composition is typically at least about 30 wt. %, based on the weight of the composition, with the balance being the monomer, the treated mineral clay mixture (i.e. the thixotrope), primary pigment, fillers, reinforcement fibers and additives (e.g. promoters, catalyst, dispersants, etc).

The alkyl quaternary ammonium-treated mineral clay mixture of the invention is generally employed in the unsaturated polyester resin system in an amount such that the final unsaturated polyester composition will have a flow curve which allows application but prevents drainage from or sag of the material from the surface to which the unsaturated polyester composition is applied. The proper thixotropic index will depend on the intended end use of the unsaturated polyester composition and the manner in which the thixotropic index is measured. In general, the unsaturated polyester composition will typically have a thixotropic index of at least about 1.5, preferably at least about 3.0. Generally, the amount of the alkyl quaternary ammonium-treated mineral clay mixture will be about 0.1 to 4 wt. %, based on the weight of the final polyester composition.

The invention will now be illustrated by examples, which are to be regarded as illustrative and not delimitative of the invention. Unless otherwise indicated to the contrary, all parts and percentages are by weight.

EXAMPLE 1

A series of organoclay compositions were prepared from mineral clay combinations which were processed as above described, i.e. crushed, ground, slurried in water and screened, and then subjected to high shear by being passed as a dilute slurry through an MG mill, and then as a single slurry treated with the alkyl quaternary ammonium compounds as specified below. The resultant organoclay compositions were evaluated as thixotropes in an isophthalic unsaturated polyester resin/styrene system having a 55% resin and a 45% styrene content. 1.5 g of fumed silica (used as the control thixotrope and containing no alkyl quaternary ammonium compound) was mixed with about 140 g of the resin/styrene system on a laboratory disperser with a tip speed of approximately 1000 ft/minute for 15 minutes. A cobalt gellation promoter was added at 0.25 wt. % of the resin weight. The promoter was a mixture of 8 parts of cobalt octoate to 1 part of dimethyl aniline. The sample was then shaken on a paint shaker for 45 seconds. The above procedure was repeated with 2.3 g of the organoclay compositions. Brookfield viscosities were measured in centipoise at one hour. The thixotropic index ("TI") is the ratio of viscosities at 10 and 100 rpm. The results are shown in Table I below.

TABLE I

| | Mineral Clay Combinations | Viscosities, cps. RPM | | | |
|---|---|---|---|---|---|
| | Quaternary Ammonium Compound | 1 | 10 | 100 | TI |
| 1. | Fumed Silica | 6500 | 1600 | 650 | 2.46 |
| 2. | 80% sepiolite/20% hectorite 60 meq. 50% DMHTEHAMS/ 50% DMDHTAC | 5000 | 1400 | 620 | 2.28 |
| 3. | 70% palygorskite/30% montmorillonite 60 meq. DMBHTAC | 1500 | 700 | 475 | 1.47 |
| 4. | 100% montmorillonite 120 meq. 75% DMDHTAC/ 25% DMBHTAC | 500 | 400 | 400 | 1.00 |
| 5. | 100% sepiolite 60 meq. 50% DMHTEHAMS/ 50% DMDHTAC | 1500 | 800 | 500 | 1.70 |
| 6. | 75% sepiolite/25% montmorillonite 60 meq. DMBHTAC | 2000 | 900 | 530 | 1.70 | meq = milliequivalents; DMHTEHAMS = dimethyl hydrogenated tallow-2-ethylhexylammonium methylsulfate; DMDHTAC = dimethyl di(hydrogenated tallow) ammonium chloride; MBDHTAC = methylbenzyl di(hydrogenated tallow) ammonium chloride; DMBHTAC = dimethylbenzyl hydrogenated tallow ammonium chloride.

EXAMPLE 2

Example 1 was repeated using an orthophthalic unsaturated polyester resin/styrene system having a 60% resin and a 40% styrene content. The thixotropes were loaded at 1 wt.

%, based on the weight of the total composition. The results are shown in Table II below.

TABLE II

| | Mineral Clay Combinations | Viscosities, cps. RPM | | | |
|---|---|---|---|---|---|
| | Quaternary Ammonium Compound | 1 | 10 | 100 | TI |
| 7. | 67% sepiolite/33% hectorite 69 meq. DMBHTAC | 7000 | 1350 | 530 | 2.58 |
| 8. | 67% sepiolite/33% hectorite 63 meq. DMBHTAC | 10000 | 1900 | 670 | 2.84 |
| 9. | Fumed Silica | 11000 | 2300 | 750 | 3.06 |

EXAMPLE 3

Example 1 was repeated using a dicyclopentadiene polyester resin/styrene system having a 63% resin and a 37% styrene content. The thixotropes were loaded at 1.5%, based on the weight of the total composition. The results are shown in Table III below.

TABLE III

| | Mineral Clay Combinations | Viscosities, cps. RPM | | | |
|---|---|---|---|---|---|
| | Quaternary Ammonium Compound | 1 | 10 | 100 | TI |
| 10. | 100% sepiolite 30 meq. 50% DMHTEHAMS/ 50% DMDHTAC | 1000 | 400 | 255 | 1.56 |
| 11. | 80% sepiolite/20% hectorite 60 meq. 50% DMHTEHAMS/ 50% DMDHTAC | 8000 | 1650 | 495 | 3.33 |
| 12. | Fumed Silica | 2000 | 650 | 330 | 1.97 |

EXAMPLE 4

The samples employed in this example were prepared in the following manner. Each sample was prepared by dispersing the crude sepiolite with a Cowles Dissolver into a slurry form of 2–10 wt. % solids, screened at 100 mesh/2.5 cm to remove contaminants and thereafter subjected to one pass through the MG mill at 105,460 g/cm$^2$.

Each sample was reacted with the indicated alkyl quaternary ammonium compound and indicated dosage by adding the compound to the slurry with mixing at 40–80° C. The sample was thereafter dried in a blower oven at 60–80° C. overnight and pulverized using a Pulvazet Mill.

Mineral clay sample 13 consisted of sepiolite treated with 45 meq. of 75% MBDHTAC/25% DMDHTAC and was prepared as described above.

Mineral clay sample 14 was prepared as described in respect to mineral clay sample 13 except that it was treated with an ion exchange resin (sodium form) after passage through the MG mill but prior to treatment with the alkyl quaternary ammonium compound.

Mineral clay sample 15 consisted of 80% sepiolite/20% montmorillonite treated with 55 meq. of 75% MBDHTAC/ 25% DMDHTAC and was prepared as described above with the addition of 20% montmorillonite as a slurry at approximately 3% solids. The 20% montmorillonite was passed through the MG mill three times at 316,395 g/cm$^2$ and added to the sepiolite slurry after the sepiolite slurry passed through the MG mill, but prior to treatment with the alkyl quaternary ammonium compound. 50 meq. of hydrochloric acid were added to the combined slurries prior to treatment with the alkyl quaternary ammonium compound.

Mineral clay sample 16 consisted of 80% sepiolite/20% hectorite treated with 55 meq. of 75% MBDHTAC/25% DMDHTAC and was prepared as described above with the addition of 20% hectorite as a slurry at approximately 3% solids. The 20% hectorite was passed through the MG mill three times at 210,930 g/cm$^2$ and added to the sepiolite slurry after the sepiolite slurry passed through the MG mill, but prior to treatment with the alkyl quaternary ammonium compound. 50 meq. of hydrochloric acid were added to the combined slurries prior to treatment with the alkyl quaternary ammonium compound.

Mineral clay sample 17 was prepared in the same manner as mineral clay sample 16 except that the sepiolite portion of the blend was treated with an ion exchange resin (sodium form) after passage through the MG mill but prior to blending and treatment with the alkyl quaternary ammonium compound.

Sample 18 was fumed silica.

Unsaturated polyester resin compositions consist of the resin, monomer, promoter/accelerator, inhibitor, thixotrope wetting agents and/or surfactants or rheological enhancers, and the organoclay composition of the invention. The and user will add the catalyst to cure or crosslink the composition.

There are many different types of unsaturated polyester resins of which three types are set forth in Table IV. There are also many different types of monomers. Styrene is commonly used but others such as methyl methacrylate, paramethylstyrene, vinyl toluene and others have been used. The typical promoter is a cobalt compound such as cobalt octoate or cobalt naphthenate, but other materials such as rare earth metal compounds may also be used. Typical accelerators are dimethylaniline and diethylaniline. Typical inhibitors are hydroquinone and tertiarybutylcatechol. There are many types of thixotrope wetting agents/surfactants/ rheological such as "Tween 20" which is polyoxyethylene (20) sorbitan monolaurate.

The isophthalic unsaturated polyester resin system was evaluated by mixing 100 g of resin, 30 g styrene and 2.8 g mineral clay thixotrope for 15 minutes at 3800 rpm on a "Dispersamat". 130 g of resin and 20 g styrene were added to the mixture and mixing was continued for 2 minutes at 2200 rpm. "Tween 20" was added at 7% by weight of the thixotrope and mixed for 2 minutes at 2200 rpm. A solution containing 6% cobalt octoate was mixed with dimethylaniline at an 8:1 ratio and was added at an amount of 0.05 wt. %, based on the weight of the entire composition, and mixed for 1 minute at 2200 rpm. The samples were cooled to room temperature over a 1-hour period and viscosities were measured using a Brookfield RVT viscometer at 1, 10 and 100 rpm.

The orthophthalic unsaturated polyester resin system was evaluated by mixing 150 g resin, 14 g styrene and 2.5 g mineral clay thixotrope for 12 minutes at 3800 rpm on a "Dispersamat". 62 g resin, 25 g styrene and 7% by weight of the thixotrope of "Tween 20" were added to the mixture and mixing was continued for 2 minutes at 2000 rpm. A solution containing 6% cobalt octoate was mixed with dimethylaniline at an 8:1 ratio and was added at an amount of 0.05 wt. %, based on the weight of the entire composition, and mixed for 1 minute at 2200 rpm. The samples were cooled to room temperature over a 1-hour period and viscosities were measured using a Brookfield RVT viscometer at 1, 10 and 100 rpm.

The dicyclopentadiene unsaturated polyester resin system was evaluated by mixing 150 g resin and 2.5 g mineral clay thixotrope for 12 minutes at 3800 rpm on a "Dispersamat". Thereafter, 7% by weight of the thixotrope of "Tween 20" was added to the mixture and mixing was continued for 1 minute at 2000 rpm. Then 64.3 g resin, 35.7 g styrene and a solution containing 6% cobalt octoate was mixed with dimethylaniline at an 8:1 ratio and was added at an amount of 0.05 wt. %, based on the weight of the entire composition, and mixed for 1 minute at 2200 rpm. The samples were cooled to room temperature over a 1-hour period and viscosities were measured using a Brookfield RVT viscometer at 1, 10 and 100 rpm. The results are set forth in Table IV below.

TABLE IV

| Sample | Isophthalic Viscosities, cps. | | | | Orthophthalic Viscosities, cps. | | | | Dicyclopentadiene Viscosities, cps. | | | |
|---|---|---|---|---|---|---|---|---|---|---|---|---|
| | 1 | 10 | 100 | TI | 1 | 10 | 100 | TI | 1 | 10 | 100 | TI |
| 13 | 9500 | 1450 | 395 | 3.67 | 5000 | 950 | 350 | 2.71 | 4000 | 600 | 150 | 4.00 |
| 14 | 10500 | 1550 | 455 | 3.41 | 6000 | 1100 | 385 | 2.86 | 3500 | 550 | 140 | 3.93 |
| 15 | 8500 | 1450 | 450 | 3.22 | 5000 | 900 | 365 | 2.47 | 3500 | 550 | 140 | 3.93 |
| 16 | 18506 | 2650 | 605 | 4.38 | 9060 | 1550 | 495 | 3.13 | 8500 | 1150 | 230 | 5.00 |
| 17 | 15500 | 2250 | 560 | 4.02 | 11500 | 1750 | 515 | 3.40 | 5500 | 800 | 180 | 4.44 |
| 18 | 10500 | 2150 | 660 | 3.26 | 9500 | 1850 | 625 | 2.96 | 2500 | 600 | 195 | 3.08 |

What is claimed is:

1. An unsaturated polyester resin composition, comprising:
   a solution of an unsaturated polyester resin in a monomer which is capable of undergoing a crosslinking reaction with the resin; and
   a mineral clay composition, the mineral clay composition comprising a mineral clay mixture which has been treated with an alkyl quaternary ammonium salt, wherein the mineral clay mixture comprises: a mixture of palygorskite, sepiolite and a smectite wherein the combined amount of palygorskite and sepiolite in the mineral clay mixture comprises between about 50% to about 95% by weight of the mineral clay mixture.

2. The polyester composition of claim 1, wherein the mineral clay composition is present in an amount such that the polyester composition will have a thixotropic index of at least about 1.5.

3. The polyester composition of claim 1, wherein the mineral clay composition is present in an amount such that the polyester composition will have a thixotropic index of at least about 3.0.

4. The polyester composition of claim 1, wherein the smectite comprises the balance by weight of the mineral clay mixture.

5. The polyester composition of claim 1, wherein the smectite is selected from the group consisting of hectorite, montmorillonite, bentonite, beidelite, saponite, stevensite and mixtures thereof.

6. The polyester composition of claim 1, wherein the smectite comprises hectorite.

7. The polyester composition of claim 1, wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

8. The polyester composition of claim 1, wherein the alkyl quaternary ammonium salt is selected from the group consisting of dimethyl di(hydrogenated tallow)ammonium chloride, methylbenzyl di(hydrogenated tallow)ammonium chloride, dimethylbenzyl hydrogenated tallow ammonium chloride, dimethyl hydrogenated tallow-2-ethylhexylammonium methylsulfate and mixtures thereof.

9. The polyester composition of claim 1, wherein the mineral clay mixture is treated with about 25 to about 80 meq. of the alkyl quaternary ammonium salt per 100 g of the mineral clay mixture.

10. The polyester composition of claim 1, wherein the mineral clay mixture is treated with about 35 to about 65 meq. of the alkyl quaternary ammonium salt per 100 g of the mineral clay mixture.

11. The polyester composition of claim 1, wherein the monomer comprises styrene.

12. An unsaturated polyester resin composition, comprising:
    a solution of an unsaturated polyester resin in a monomer which is capable of undergoing a crosslinking reaction with the resin; and
    a mineral clay composition, the mineral clay composition comprising a mineral clay mixture which has been treated with an alkyl quaternary ammonium salt, wherein the mineral clay mixture comprises a mixture of sepiolite and a smectite wherein the amount of sepiolite in the mineral clay mixture comprises between about 50% to about 95% by weight of the mineral clay mixture.

13. The polyester composition of claim 12, wherein the mineral clay composition is present in an amount such that the polyester composition will have a thixotropic index of at least about 1.5.

14. The polyester composition of claim 12, wherein the mineral clay composition is present in an amount such that the polyester composition will have a thixotropic index of at least about 3.0.

15. The polyester composition of claim 12, wherein the smectite comprises the balance by weight of the mineral clay mixture.

16. The polyester composition of claim 12, wherein the smectite is selected from the group consisting of hectorite, montmorillonite, bentonite, beidelite, saponite, stevensite and mixtures thereof.

17. The polyester composition of claim 12, wherein the smectite comprises hectorite.

18. The polyester composition of claim 12, wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

19. The polyester composition of claim 12, wherein the alkyl quaternary ammonium salt is selected from the group consisting of dimethyl di(hydrogenated tallow)ammonium chloride, methylbenzyl di(hydrogenated tallow)ammonium chloride, dimethylbenzyl hydrogenated tallow ammonium chloride, dimethyl hydrogenated tallow-2-ethylhexylammonium methylsulfate and mixtures thereof.

20. The polyester composition of claim 12, wherein the mineral clay mixture is treated with about 25 to about 80 meq. of the alkyl quaternary ammonium salt per 100 g of the mineral clay mixture.

21. The polyester composition of claim 12, wherein the mineral clay mixture is treated with about 35 to about 65 meq. of the alkyl quaternary ammonium salt per 100 g of the mineral clay mixture.

22. The polyester composition of claim 12, wherein the monomer comprises styrene.

23. An unsaturated polyester resin composition, comprising:

a solution of an unsaturated polyester resin in a monomer which is capable of undergoing a crosslinking reaction with the resin; and a mineral clay composition, the mineral clay composition comprising a mineral clay mixture which has been treated with an alkyl quaternary ammonium salt, wherein the mineral clay mixture comprises a mixture of palygorskite and a smectite wherein the amount of palygorskite in the mineral clay mixture comprises between about 50% to about 95% by weight of the mineral clay mixture.

24. The polyester composition of claim 23, wherein the mineral clay composition is present in an amount such that the polyester composition will have a thixotropic index of at least about 1.5.

25. The polyester composition of claim 23, wherein the mineral clay composition is present in an amount such that the polyester composition will have a thixotropic index of at least about 3.0.

26. The polyester composition of claim 23, wherein the smectite comprises the balance by weight of the mineral clay mixture.

27. The polyester composition of claim 23, wherein the smectite is selected from the group consisting of hectorite, montmorillonite, bentonite, beidelite, saponite, stevensite and mixtures thereof.

28. The polyester composition of claim 23, wherein the smectite comprises hectorite.

29. The polyester composition of claim 23, wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

30. The polyester composition of claim 23, wherein the alkyl quaternary ammonium salt is selected from the group consisting of dimethyl di(hydrogenated tallow)ammonium chloride, methylbenzyl di(hydrogenated tallow)ammonium chloride, dimethylbenzyl hydrogenated tallow ammonium chloride, dimethyl hydrogenated tallow-2-ethylhexylammonium methylsulfate and mixtures thereof.

31. The polyester composition of claim 23, wherein the mineral clay mixture is treated with about 25 to about 80 meq. of the alkyl quaternary ammonium salt per 100 g of the mineral clay mixture.

32. The polyester composition of claim 23, wherein the mineral clay mixture is treated with about 35 to about 65 meq. of the alkyl quaternary ammonium salt per 100 g of the mineral clay mixture.

33. The polyester composition of claim 23, wherein the monomer comprises styrene.

* * * * *